United States Patent Office 3,686,090
Patented Aug. 22, 1972

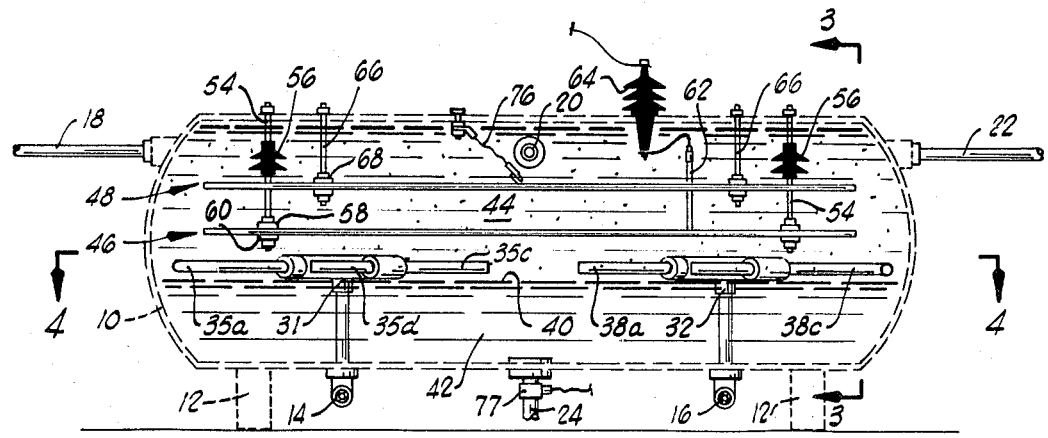
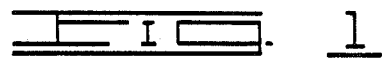
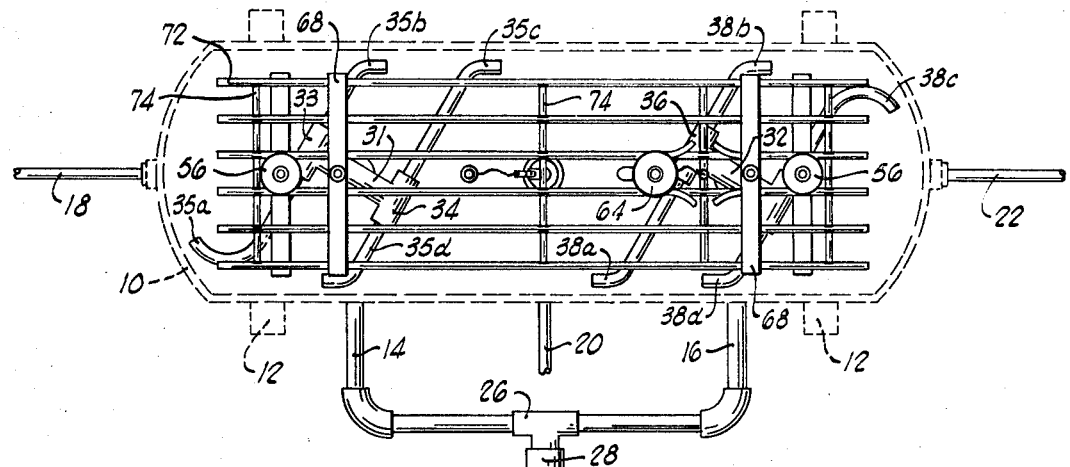
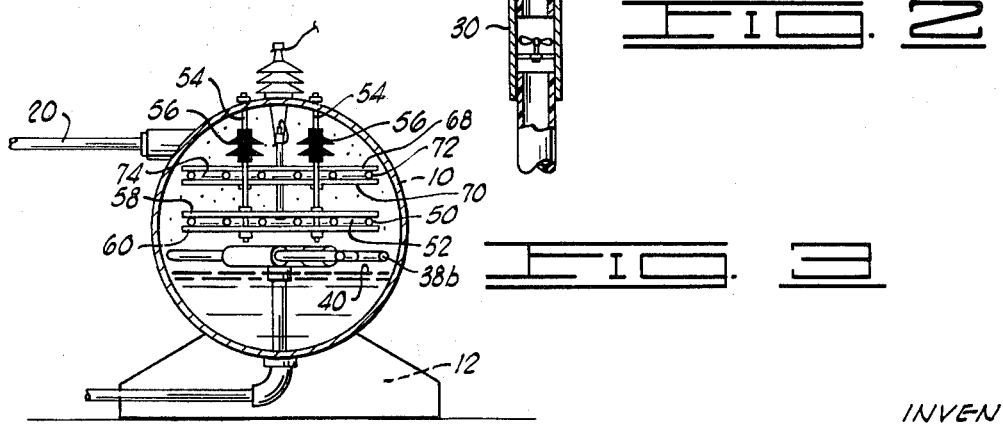
INVENTOR
DWIGHT B PFENNING &
ROBERT L. BROWN
BY
ATTORNEYS

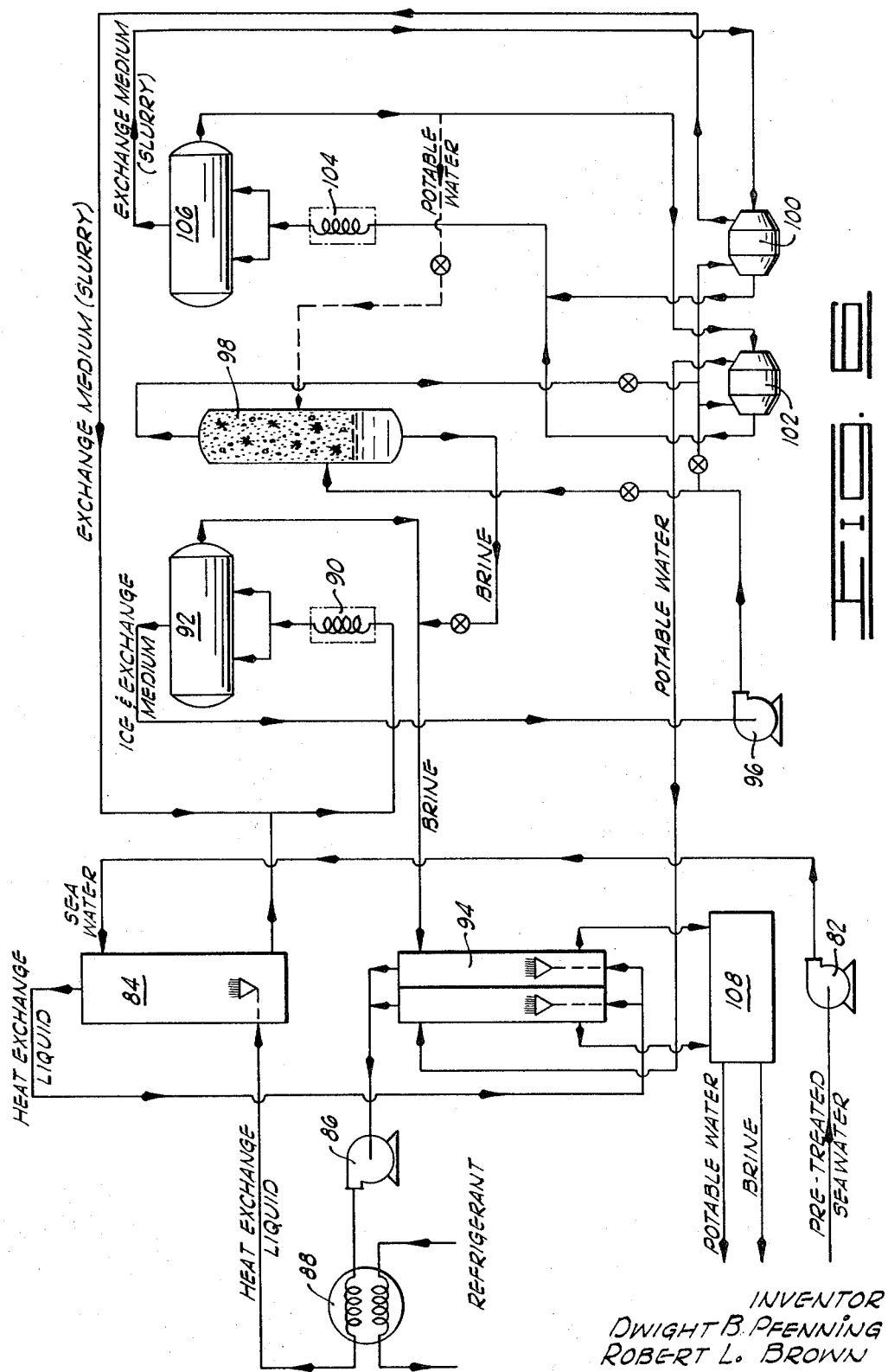

3,686,090
METHOD AND APPARATUS FOR RECOVERING WATER FROM A HYDROCARBON SLURRY
Dwight B. Pfenning, Oklahoma City, and Robert L. Brown, Norman, Okla., assignors to E-C Corporation, Dallas, Tex.
Filed Sept. 17, 1970, Ser. No. 72,946
Int. Cl. B01d 9/04; B03c 5/00; C02b 1/12
U.S. Cl. 204—186                                        14 Claims

ABSTRACT OF THE DISCLOSURE

Water is separated from an intimate mixture of the water with an organic slurry which includes organic liquid and solid organic particles by subjecting the mixture to a high potential electrical field developed between electrodes within a separation tank. The mixture of water and slurry is introduced to the lower portion of the tank preferably slightly above the level of the water layer within the tank, and is directed parallel to the interface between the water layer and the overlying layer of organic slurry. The mixture is directed upward through widely spaced electrode grids provided in the upper portion of the tank. The separation process is especially well adapted for use in a method for separating relatively pure water from aqueous solutions which involves the phenomena of exchange crystallization, in which ice crystals are first frozen from a saline aqueous solution, and later are melted by applying pressure to a mixture of the ice crystals with an organic liquid having properties such that the organic liquid undergoes partial freezing upon the application of sufficient pressure to melt the ice crystals.

BACKGROUND OF THE INVENTION

Field of the invention

This invention relates to methods for separating water from an organic material, and more particularly, but not by way of limitation, to a method for separating water from a hydrocarbon slurry containing hydrocarbon in both liquid and solid form.

Brief description of the prior art

It is well known in many fields of technology, such as, for example, that of petroleum production and refining, to provide electrostatic dehydrating devices in which water is separated from crude petroleum or other hydrocarbon liquids by passing an emulsion or dispersion of the water in the hydrocarbon or oil through a high electrical potential field. The treatment of the mixture by the field results in the water being coalesced into relatively large droplets which then will separate from the hydrocarbon by reason of the density difference of the materials. This technique has been used for over fifty years in petroleum technology for the recovery of useful amounts of oil from difficultly separatable intimate dispersions of the oil with salt water, or other waters with which the oil has come in contact during the production or refining procedure.

Recently, it has been proposed to recover fresh water from saline aqueous solutions by a process which has been referred to in some instances as exchange crystallization. In the use of this procedure, brine or other saline aqueous solution is initially subjected to direct heat exchange contact with an organic slurry which has been selected to have properties which will permit an exchange of the latent heats of change of state between the aqueous solution and the organic heat exchange medium. Thus, ice crystals are frozen from the aqueous solution with the concurrent melting of solid particles of the organic heat exchange medium. The ice crystals are then separated from the saline aqueous solution from which they have been frozen, and are moved to a pressurizing zone where an intimate mixture of the ice crystals with the organic liquid is subjected to relatively high pressure. The result of such pressurization is to lower the melting point of the ice crystals so that the crystals undergo melting. The freezing point of the organic liquid is concurrently raised due to the pressure increase, with the result that solid particles of the organic material are developed by freezing, and the slurry used in the first step of the process is regenerated.

Then follows the procedure of separating the fresh water derived from the melting of ice from the organic slurry. It has been previously proposed to accomplish this separation by centrifugation and other techniques relying upon the difference in density between the fresh water and the organic slurry. Separation procedures of this kind, while effective to some degree, do not result in the recovery and isolation from the mixture of as high percentage of the total water content thereof as is desirable. It would also be desirable in the process to improve the efficiency of separation of the organic liquid and ice crystals, which are developed in the first step of the process, from the brine or other aqueous solution, preparatory to transferring the ice crystals and organic liquid to the final pressurization step where the ice crystals are melted, and the organic slurry regenerated.

BRIEF DESCRIPTION OF THE PRESENT INVENTION

In one aspect, the present invention constitutes and provides an improvement in a process for treating aqueous solutions to remove or separate fresh or relatively pure water therefrom by subjecting the solution to exchange crystallization. In the exchange crystallization procedure, ice crystals are frozen from the aqueous solution by heat exchange with a solid organic heat exchange medium having melting point characteristics such that solid particles of the organic material are melted concurrently with the freezing of ice crystals from the aqueous solution, and there is an exchange of the latent heats of change of state between the condensed media making up the heat exchange system. At a later point in the process, the ice crystals, after having been separated from the mother aqueous solution, and while in intimate admixture with the organic heat exchange medium, are subjected to an increase in pressure to melt the ice crystals and concurrently freeze particles of the organic heat exchange medium to form a slurry of these particles in the organic liquid. The present invention constitutes improvements in the described procedure in facilitating a more efficient separation of the water (formed upon pressurization of the ice crystal-organic heat exchange medium mixture) from the slurry of organic solid particles which is produced upon pressurization. Separation of the water from the slurry is accomplished in accordance with the present invention by subjecting the water-slurry mixture to a high voltage electrical field while the mixture is contained within a pressure vessel. By the use of the electrical field applied to the pressurized mixture by the location of specially constructed electrodes therein, a very high percentage of the total water content of the mixture is separated from the slurry and can be removed from one location within the pressure tank while the slurry is discharged from another location in the tank. The invention also contemplates a further improvement in the exchange crystallization process which constitutes subjecting the mixture of hydrocarbon liquid, ice crystals and the parent aqueous solution to the influence of a high voltage electrical field in order to more effectively separate the ice crystals and organic exchange medium from the relatively more dense aqueous solution preparatory to charging the ice crystals and liquid organic exchange medium to the final pressurization step in which exchange crystallization is carried out to melt the ice and generate the organic exchange medium slurry.

In a broader aspect, the invention relates to novel apparatus which has special utility in the separation of water from an intimate mixture of the water with a hydrocarbon or organic slurry containing a high percentage of solids. The mixture may be a suspension or dispersion which is difficult to separate by other methods such as centrifugation or gravity settling, and the apparatus is constructed so that the presence in the mixture of a large quantity of solids does not impair the effective functioning of the apparatus for developing and maintaining the necessary electrical field to accomplish efficient separation. The apparatus thus provided by the present invention may be generally described as comprising a pressure vessel which has connected thereto, suitable conduits or piping to facilitate the introduction of the mixture to be separated into the lower portion of the pressure vessel in such a way that the mixture is directed into the vessel at a plurality of horizontally spaced locations. Positioned above the locations in the lower portion of the vessel at which the mixture is introduced is at least one, and preferably two, electrodes which are specially constructed to permit free flow of the mixture upwardly through the electrodes.

More specifically, the construction of each of the electrodes comprises a plurality of relatively widely spaced rods, and these rods are suspended by suitable means within the tank so as to constitute a grid in the case of each electrode, with two electrodes being vertically spaced from each other, and from the water level which is developed in the lower portion of the pressure vessel during the use of the apparatus. A high potential difference is developed between one of the electrodes and the water which is grounded through the tank, and between the same electrode and a second electrode.

We have determined that subjection of the difficultly separable mixture of fresh water and an organic slurry to a high potential electrical field, while maintaining the mixture under pressure to retain the advantage derived from exchange crystallization, results in a much more complete separation of the fresh water from the slurry. Due to the high solids content of the slurry, special care must be exercised to assure that the electrodes used in the apparatus for providing the high potential electrical field do not become fouled or clogged by the solids in the mixture, and care must also be exercised that conductive paths are not established between the electrodes and the water layer developed upon separation so that the effect of the high potential field in coalescing the water into large droplets is not defeated.

An important object achieved by the present invention is the efficient separation of water from an intimate and difficultly separable mixture of the water with an organic slurry containing a high percentage of solid particles.

An additional object of the invention is to provide an improved method for separating fresh water from saline aqueous solutions, using a combination of the techniques of exchange crystallization or inversion of melting points, and electrostatic dehydration.

A further object of the invention is to provide an electrical field dehydrator apparatus which can be operated under high pressure, and used to treat dispersions which contain a high percentage of solid particles of organic material.

Additional objects and advantages of the invention will become apparent as the following detailed description of the invention is read in conjunction with the accompanying drawings which illustrate the invention.

BRIEF DESCRIPTION OF THE DRAWINGS

FIG. 1 is a side elevation view of a separation apparatus constructed in accordance with the present invention, and showing in dashed lines, the walls and support members of the pressure tank forming a portion of the apparatus.

FIG. 2 is a plan view of the apparatus depicted in FIG. 1, and also showing in dashed lines, the walls of a pressure vessel forming a portion of the apparatus.

FIG. 5 is a perspective view of the apparatus illustrated in FIG. 1.

FIG. 6 is a schematic flow diagram illustrating a preferred embodiment of the invention as used in a process for the recovery of fresh water from an aqueous solution.

DETAILED DESCRIPTION OF A PREFERRED EMBODIMENT OF THE INVENTION

Figure 7:
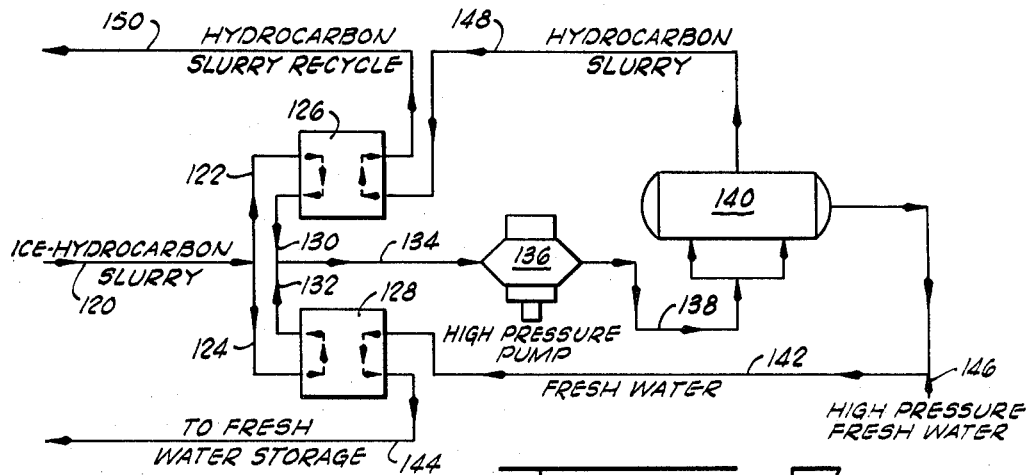
FIG. 7 is a schematic flow diagram illustrating the manner in which the present invention is utilized in conjunction with a pressure energy exchange engine in an exchange crystallization process for recovering relatively fresh water from a saline aqueous solution.

FIGS. 1–5 illustrate an electrical coalescence separator constructed in accordance with the invention, and useful for separating water from a slurry of organic material containing a relatively high percentage of solid particles of organic material in organic liquid. The coalescence separator includes a pressure tank 10 of generally cylindrical configuration which is constructed of a material of sufficient strength to withstand pressures of the order of 3,000 p.s.i. The pressure vessel 10 is supported upon support members 12 and has connected thereto, a pair of input pipes or conduits, 14 and 16, three slurry discharge conduits, 18, 20, and 22, and at least one water discharge conduit, 24. The input conduits, 14 and 16, are connected through a suitable T fitting 26 to a supply pipe 28, which has suitably positioned therein an "in-barrel" mixer 30 which agitates and effectively homogenizes the mixture of water and organic slurry constituting the material charged to the electrical coalescence separator. This mixture can be derived from any source, and the coalescence separator has particular utility when used for separating the product mixture produced in the final pressurization step of an exchange crystallization procedure, as hereinafter explained.

Figure 4:
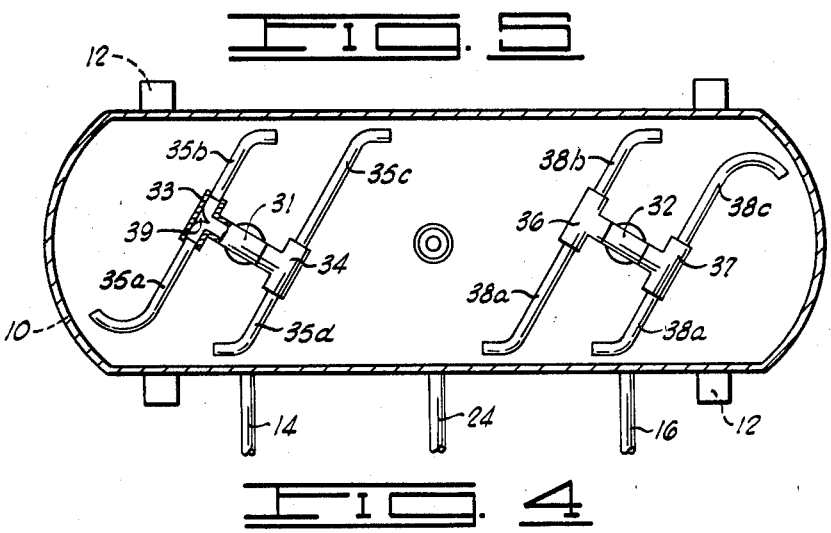
FIG. 4 is a sectional view taken along line 4—4 of FIG. 1.

In the lower portion of the pressure vessel 10 the input conduits 14 and 16 extend upwardly and are connected at their upper ends to T fittings, 31 and 32, respectively (see FIG. 4). Additional T fittings 33 and 34 facilitate connection of the input conduit 14 to distribution pipes 35a, 35b, 35c and 35d, and T fittings 36 and 37 are used to connect input conduit 16 to distribution pipes 38a, 38b, 38c and 38d. As will be noticed in referring to FIGS. 1 and 4, the distribution pipes 35a–35d and 38a–38d extend horizontally in the pressure vessel 10 and are curved at their ends so that the mixer charged to the vessel will be directed around the interior walls of the pressure vessel. It will be noted that a bifurcated distribution plate 39 is positioned in each of the T fittings 33, 34, 36 and 37 and functions to evenly distribute flow to the two distribution pipes connected to each of these fittings. The distribution pipes 35a–35d and 38a–38d are positioned at a location which, during operation of the apparatus, is just above an interface 40 between a water layer 42, developed within the vessel, and an overlying layer of organic slurry 44 of the type previously described. It will be further noted that the distribution system constituted by the distribution pipes 35a–35d and 38a–38d provides for charging the mixture to be separated to the interior of the vessel at eight horizontally spaced points within the vessel. As will be hereinafter explained, this arrangement is desirable to provide adequate agitation in the organic layer to provide the desired homogeneity and uniformity of density distribution.

Located in the upper portion of pressure vessel 10 are a pair of electrode assemblies designated generally by reference numerals 46 and 48. The electrode assembly 46 may be described as the lower electrode assembly. This electrode assembly 46 is connected directly to one side of a transformer which delivers high voltage alternating current to the grid of the electrode assembly as hereinafter explained. The electrode assembly 48 may be referred to as the upper electrode assembly, and also as the grounded electrode assembly since this assembly is grounded through the tank in a manner hereinafter described.

Each of the electrode assemblies 46 and 48 comprises a grid of relatively widely spaced metal rods which are positioned horizontally within the vessel 10 and suspended from the top wall of the vessel. Thus, in the case of the lower electrode assembly 46 this assembly includes a plurality of longitudinally extending metal rods or bars 50 which are joined or interconnected by transversely extending rods or bars 52. In a typical embodiment of the invention, rods having a diameter of ¼ inch are utilized for both the longitudinal rods 50 and the transverse rods 52, and the spacing between the longitudinal rods is preferably from one to two inches. It is important to proper functioning of the apparatus to have adequate spacing between the rods making up the grid of each of the electrode assemblies since the high solids content of the mixture which is charged to the pressure vessel 10 would tend to clog or choke the openings through electrode grids where the openings are relatively small, such as in the case of expanded metal electrodes, or a number of other types which have previously been used in electrostatic dehydration devices. The lower electrode assembly is suspended from the top wall of the pressure vessel 10 by a plurality of suspension elements which include metallic rods 54 which are connected through suitable insulator elements 56 to the lower electrode assembly. The grid formed by the longitudinal rods 50 and transverse rods 52 is clamped between a pair of support plates 58 and 60 connected to the lower end of the support rods 54 at opposite ends of the electrode assembly 46. As will be understood by those skilled in the art, the insulator elements 56 insulate the electrode assembly 46 from the metallic walls of the pressure vessel 10. The lower electrode assembly 46 is connected through a contact rod 62 and an insulator which is mounted in the top wall of the vessel 10 to a suitable source of electrical current, such as one side of a transformer (not shown).

The upper electrode assembly 48, like the lower electrode assembly 46, is suspended from the top wall of the pressure vessel 10, by means of a pair of suspension rod 66. The suspension rods 66 are connected at their lower ends to a pair of cross members 68 and 70 which are retained above and below the upper electrode assembly 48 by suitable nuts. The upper electrode assembly 48 includes horizontally spaced, longitudinally extending rods 72 which are interconnected by transverse rods 74 similarly to the construction of the lower electrode assembly 46. A ground wire 76 is connected between the upper electrode assembly 48 and the top wall of the pressure vessel 10.

OPERATION

The function of the electrical coalescence separator illustrated in FIGS. 1–4 is to achieve efficient separation of water from an organic slurry containing relatively small solid particles of organic matter in an organic liquid. Frequently, mixtures of water with such slurries present a difficult separation problem because the emulsions or dispersions which are formed are difficult to break, and a considerable amount of the water cannot be recovered from the mixture by such methods as centrifugation or gravity settling, etc. Chemical treatment also is often not effective, and in some situations, such as where high cost of treating, and the necessity for the aqueous product to be of high purity obtain, cannot be carried out satisfactorily.

In the use of the electrical coalescence separator for removing water from mixtures of the type described, the mixture from which the water is to be separated is charged to the pressure vessel 10 from a supply pipe 28. The mixture charged may typically be a slurry material containing hydrocarbon liquid and particles of hydrocarbon solid mixed with water. The solids content of the mixture may be relatively high as, for example, of the order of 25 to 50 percent. Since in at least one application of the electrical coalescence separator, the separation must be effected under relatively high pressure, the pressure vessel 10 is of a cylindrical configuration, and is constructed to withstand pressures of up to 3000 p.s.i. In order to permit the separation apparatus to effectively treat the mixture, it is desirable that the mixture be homogeneous as it enters the pressure vessel 10.

For the purpose of preventing stratification or inhomogeneity in the feed stream entering the vessel 10, an in-barrel mixer device 30 is preferably incorporated in the supply pipe 28, and functions to agitate and homogenize the mixture passing through this pipe. The feed stream is split through the fitting 26 into the input pipes 14 and 16 so that the stream may be introduced at widely spaced points within the vessel 10. The input pipes 14 and 16 in turn feed the distribution pipes 35a–35d and 38a–38d so that the mixture is distributed within the lower portion of the vessel 10 at eight horizontally spaced locations.

The mixture is directed upwardly within the vessel and, as will be seen, passes from the distribution pipes horizontally at a point just above the interface between the water layer located in the lower portion of the vessel and a layer which is predominantly slurry overlying the water layer. It will be apparent that the density of the organic or hydrocarbon material which is mixed with the water in the incoming mixture is relatively low compared to the density of the water. Therefore, upon saturation of the water from the mixture, the described stratification will occur as a result of gravitation of the water to the lower portion of the pressure vessel 10.

As the mixture leaves the ends of the distribution pipes 35a–35d and 38a–38d, it rises upwardly due to its relatively lower density, and in undergoing upward movement, passes through the openings provided between the longitudinal rods 50 of the lower electrode assembly 46. As has been previously pointed out, the rods 50 and 52 making up the lower electrode assembly 46 are spaced relatively widely from each other so that no fouling or clogging occurs as a result of accumulation of solid particles in the openings between these rods. It has been determined that with a very high solids content mixture of the type under consideration, expanded metal electrodes, screens and other relatively small opening-type grids cannot be effectively utilized over long periods of time due to the choking and clogging of such grids by the entrained solids. After passing through the lower electrode assembly 46, the mixture to be separated continues to move upwardly within the vessel 10 and also passes through the relatively widely spaced longitudinal rods 72 and transverse rods 74 making up the upper electrode assembly 48.

During the movement of the mixture upwardly within the pressure vessel 10, there is, of course, some tendency for water to separate from the mixture due to its relatively greater density than the density, of either the mixture as a whole or the organic material with which it is mixed. The separation would be far less than complete as a result of density difference alone, however, and separation is therefore accelerated and rendered more effective and complete as a result of subjecting the mixture to a high potential field developed as a result of the positioning of the upper and lower electrode assemblies 48 and 46, respectively, within the vessel 10.

Figure 3:
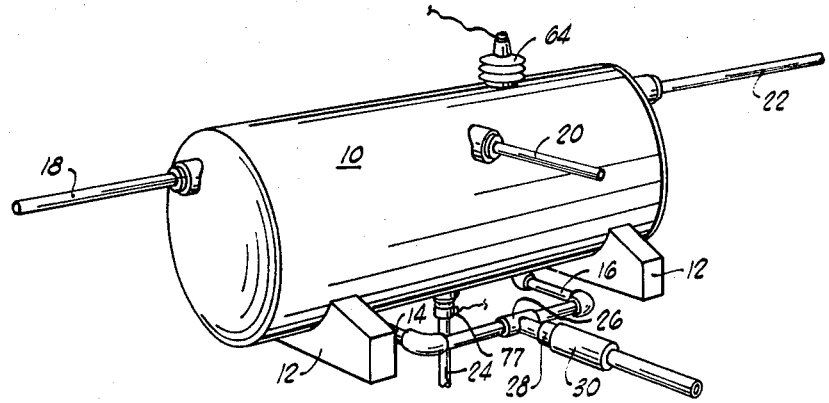
FIG. 3 is a sectional view taken along 3—3 of FIG. 1 and showing the walls of the pressure vessel and a support member for the pressure vessel in full lines.

With the arrangement which is depicted in the embodiment of the invention illustrated in FIGS. 1–3, the lower electrode assembly 46 is connected directly through a suitable electrical lead to one side of a transformer for receiving high voltage alternating current from the transformer. The other side of the circuit from the transformer is grounded. To complete the circuit and establish the high voltage field within the pressure vessel 10, the vessel is grounded by means of a suitable ground connection 77 which is shown attached to one of the water discharge conduits 24, but which may also be attached directly to the vessel 10 at any point below the interface 40 between the water layer and the organic slurry layer. The upper electrode assembly 48 is connected by a suitable electrical lead to the vessel 10 so that this electrode assembly is grounded. With the arrangement described, a high potential field is established between the lower electrode assembly 46 and the conductive body of water 42 positioned in the lower portion of the pressure vessel 10. The field acts across the intervening non-conductive layer of organic slurry, and, in accordance with principles now well understood and established in the art, causes the coalescence of relatively minute droplets of water carried upwardly in the mixture through this imposed high potential field. As the water droplets coalesce, they become sufficiently large to more easily be separated by gravity from the slurry in which the water is initially entrained. The coalesced droplets then gravitate to the layer of water 42.

In like manner, an electrical field is established between the lower electrode assembly 46 and the upper electrode assembly 48. The mixture of organic slurry and water which continues to move upwardly past the lower electrode assembly 46 is subjected to this field and the further coalescing effect induced in the water thereby. Relatively small water droplets thus coalesce with the result that larger drops are formed and soon separate from the upwardly moving slurry by reason of density difference.

After the electrical coalescence separator has been placed in operation in the manner described, the separated products are continuously removed from the pressure vessel as the mixture to be separated is continuously charged thereto. Thus, water accumulated within the water layer 42 in the lower portion of the vessel 10 is removed from the vessel through the product water discharge pipe 24. The organic slurry which exists in its purest, most water-free form in the uppermost portion of the vessel 10 is removed from this portion of the vessel through the conduits 18, 20 and 22.

The described electrical coalescence separator has many applications, and is useful in any situation where it is desirable to separate water or an aqueous solution from an organic slurry which contains a high percentage of solids, in addition to an organic liquid material. One of the applications for which the coalescence separator is most useful is in the recovery of fresh water which has been derived from a saline aqueous solution by a recently proposed process termed exchange crystallization. The use of the coalescence separator in this way can best be explained by reference to FIG. 6 of the drawings.

APPLICATION OF INVENTION IN EXCHANGE CRYSTALLIZATION

In FIG. 6 of the drawings, there is illustrated schematically a flow diagram showing a system which may be utilized for recovering fresh water from a saline aqueous solution by the process of exchange crystallization. This process is described in Sliepcevich et al. U.S. Pat. 3,399,538, and the apparatus is similar to that which is there shown except for the inclusion in the system of the electrical coalescence separator of the present invention. The disclosure of that patent is incorporated herein by reference in order to supplement the details here provided as to the types of organic materials useful as heat exchange media in an exchange crystallization process, and certain other details relative to the carrying out of the process.

A saline aqueous solution, such as sea water, is pumped by a suitable pump 82 into the depicted system after the sea water has been subjected to conventional pre-treatment which includes filtration and deaeration of the sea water. The sea water is pumped by the pump 82 to the top of a direct contact precooling chamber 84. In this chamber the sea water contacts, by countercurrent flow, a heat exchange liquid which is immiscible with the sea water, and has a density sufficiently different from the sea water to facilitate separation, and a freezing point below about −5° C. Due to the density difference between the materials in the precooling chamber 84, the sea water separates and accumulates at the bottom of the direct contact precooler chamber, and the heat exchange liquid rises to the top of this chamber. Prior to its introduction to the direct contact precooler chamber 84, the heat exchange liquid is pumped by a suitable pump 86 through an indirect makeup refrigeration unit 88 where the temperature of the heat exchange liquid is reduced to about the initial freezing point of the aqueous solution, which in the case of sea water is usually around −2° C.

Cooled sea water is removed from the lower portion of the chamber 84 at a temperature near its freezing point, and is merged with a heat exchange medium prior to entering a crystallization zone 90. The heat exchange medium is an organic material which is in the form of a slush or slurry consisting of a frozen substance suspended in its own mother liquor, and at its equilibrium melting temperature. The exchange medium constituted by the organic slurry should be immiscible in the sea water and also in fresh water, and should be stable in the presence of, and unreactive with, both the water and the solute of the aqueous solution to the extent that no irreversible physical or chemical transformations occur during direct intimate contact between the aqueous solution and the exchange medium. The density of the organic slurry is less than that of the aqueous solution, and also less than that of fresh water. Another property which should characterize the organic exchange medium is a freezing point which is at least as low as the freezing point of the sea water. Finally, the organic exchange medium must have a freezing point which increases with an increase in the pressure applied to the material. This is the heart of the exchange crystallization process and enables the solid particles in the organic slurry to be melted in heat exchange with the sea water so as to freeze ice crystals from the sea water. It also permits a later regeneration of the slurry by applying pressure which concurrently melts the ice crystals and regenerates solid particles of the slurry. The organic exchange medium slurry and the precooled sea water are directly and intimately mixed in an ice crystallization zone 90. During this direct contact by intimate mixing, the solid particles of organic material in the exchange medium slurry melt. This lowers the temperature of the sea water exchange medium slurry and causes ice crystals to be formed.

Upon the occurrence of exchange crystallization in the ice crystallization zone 90, there is produced a mixture of organic liquid, ice crystals and brine which is formed as the sea water becomes more concentrated due to freezing of the ice crystals therefrom.

From the ice crystallization zone 90, this mixture is passed into an electrical coalescence separator 92 which is constructed in accordance with the present invention. Here the mixture of ice crystals, brine, and organic liquid is introduced as a homogeneous mixture and moves upwardly in the pressure vessel of the coalescence separator 92. As the mixture moves upwardly in the separator, it is subjected to the high voltage field hereinbefore described with the result that particles of brine tend to undergo coalescence and form droplets of sufficient size that the brine is knocked out of the mixture and gravitates to the bottom of the vessel and there accumulates. Since the ice crystals are considerably less dense than the brine, and since there is also a generally upward flow of the mixture within the vessel 92, ice crystals and the organic liquid tend to be moved to the top of the coalescence separator. In some instances where relatively dense organic exchange medium liquid has been selected, the ice crystals may be even less dense than this liquid and thus tend to move more easily into the upper portion of the vessel.

The brine, which has accumulated in the lower portion of the electrical coalescence separator 92 is removed from the bottom of this separator and is transmitted through a suitable conduit to one side of a compartmented precooler 94. The slurry of ice and liquid organic exchange medium in the upper portion of the vessel 92 is withdrawn and passed through an intermediate pump 96 which is driven by any suitable source of power.

The pump 96 raises the pressure on the mixture of ice and organic liquid constituting the exchange medium to between about 10 and about 100 atmospheres. This increase in pressure constitutes a first stage of pressurization. The pressurized ice and organic liquid may, if desired, then be passed to a wash tower 98 where the residual brine is washed off the ice crystals and separated by density difference. This residual brine is passed out of the system through the precooler 84. The washed slurry of ice and liquid organic heat exchange medium are removed as overhead from the wash tower 98, and are then split into two streams for final pressurization in the dual, pump-expander units 100 and 102. It may be mentioned that instead of employing the wash tower 98, the discharge from the pump 96 can be diverted entirely or in part directly to the dual pump expander units 100 and 102 so as to by-pass the wash tower 98 or any equivalent structure.

In the dual, pump-expander units 100 and 102, pressure on the ice crystals and organic liquid used as an exchange medium is increased. The extent to which the pressure is increased will depend upon the particular organic exchange medium utilized, but in general, a pressure of from about 50 to about 200 atmospheres will be adequate. In any case, the pressure developed on the ice crystals and organic liquid must be sufficient to lower the melting point of the ice crystals so that these crystals are melted to produce fresh water. The pressure must also be sufficiently large that a portion of the organic liquid is frozen to form particles and thus regenerate the slurry which is the form in which the organic exchange medium is initially utilized. The temperature of the mixture may range from about 25° F. to about 40° F.

The output from the dual pump-expander units 100 and 102 is directed through an exchange crystallization zone 104 where the transformation of ice to water, and the regeneration of the organic slurry occurs. From this high pressure exchange crystallization zone 104, the intimate mixture of fresh water in the organic exchange medium slurry is passed to a second electrical coalescence separator 106 constructed in accordance with the present invention. In this separator 106, the high potential field again causes coalescence of water droplets, and an effective separation of water from the organic slurry. Due to the construction of the electrode grids in the coalescence separator 106, no chocking or clogging occurs to impair the operativeness of the separator, and efficient recovery of fresh water from the organic slurry is realized. We have found that more economical and efficient water recovery can be achieved by the use of the electrical coalescence separator at this location than with such devices as cyclone centrifuges, and the like which effect separation by density difference alone. The electrical coalescence separator 106 includes, as previously described, a pressure vessel, and this vessel is constructed to withstand the high pressures which are developed in effecting the final exchange crystallization step in the exchange crystallization zone 104.

Fresh water separated by the use of the electrical coalescence separator 106 is withdrawn from the lower portion of the separator, and is passed through the pump-expander unit 102. Here this water may be expanded down to about 1 atmosphere pressure, and the recovered energy resulting from such expansion utilized to conserve energy in operating the pump-expander unit, and to aid in increasing to the desired level, the pressure on the ice-liquid exchange medium passing through the other side of the pump-expander unit. After passing through the pump-expander unit 102, the cold fresh water is directed to the top of the opposite side of the compartmented direct contact precooler 94 from the side into which the cold brine from the separator is directed. It will be apparent that the construction of the compartmented, direct contact precooler 94 is such that the fresh water and brine entering opposite sides thereof are not allowed to come in direct contact with each other. Both the water and brine flow downwardly in their respective chambers in countercurrent flow to a rising stream of a heat exchange liquid which is recovered from the top of the direct contact precooler chamber 94 as hereinbefore described. This heat exchange liquid is introduced in two separate streams to the bottoms of the two compartments of the compartmented, direct contact precooler 94. Since the heat exchange liquid is much less dense than either the fresh water or the brine, it moves to the top of the compartmented precooler, and is pumped from the precooler by pump 86 through the makeup refrigeration unit 88. The purpose of the makeup refrigeration unit 88 is to permit heat losses in the heat exchange liquid to be made up so that it enters the direct precooler chamber 84 at the desired temperature.

The fresh water and brine are each removed from the bottom of the respective compartments of the compartmented precooler 94, and are directed through a purifier 108, such as an absorbent bed or filter, to remove unacceptable traces of exchange media which may be entrained in the fresh water and brine. In the case of the brine, of course, scrubbing or recovery of the exchange medium is more for the purpose of conservation of this material, than it is for the purpose of purifying the brine. It may be pointed out further that, instead of the purifier constituting an absorbent bed or filter, it is possible and sometimes advantageous to again use at this location in the process, an electrical coalescence separator even though the problem of a high solids content is not encountered here.

The exchange medium slurry which has been regenerated in the high pressure exchange crystallization zone 104, after separation from the fresh water by the action of the electrical coalescene separator 106, is removed from the top of the separator and, while still under superatmospheric pressure, is passed to a pump-expander unit 100. In passing through the pump-expander unit 100, the exchange medium slurry expands to approximatley 1 atmosphere pressure, and a major portion of the energy given up by the exchange medium slurry in undergoing expansion is delivered by the other end of the pump-expander unit 100 to the mixture of ice crystals and organic liquid exchange medium being pumped to the high pressure exchange crystallization zone 104. Thus, the required net power input to attain the desired pressure level is reduced.

From the pump-expander unit 100 the organic exchange medium slurry is recycled to a point where it is introduced to the precooled sea water moving from the direct contact precooler chamber 84 to the ice crystallization zone 90.

In FIG. 7 of the drawings, a flow diagram for an exchange crystallization process is illustrated, and there is shown therein, an energy exchange engine of the type depicted and described in U.S. Pat. 3,431,747 as such engine is used in conjunction with the coalescence separator of the present invention. As here shown, an ice-hydrocarbon slurry (which has been generated at an upstream point in a desalination process as previously described in referring to FIG. 6, by the concurrent melting of solid particles of hydrocarbon while freezing ice particles from the saline aqueous solution) is shown moving in a stream designated by reference numeral 120. At this time it may be assumed that substantially all of the concentrated saline solution has been removed from the process stream by use of electrical dehydration or other adequate removal procedure prior to the arrival at the location depicted as stream 120 in FIG. 7.

The stream 120 containing ice and hydrocarbon liquid is split or divided into two streams 122 and 124 which are directed to a pair of pressure energy exchange engines 126 and 128 of the type described in U.S. Pat. 3,431,748. The streams of ice and hydrocarbon liquid entering the energy exchange engines 126 and 128 are substantially lower in pressure than the ultimate, relatively high pressure which is required to melt the ice to produce water, and to produce solid hydrocarbon particles in the liquid hydrocarbon, and thus regenerate the slurry used in the initial ice freezing step of the exchange crystallization process. As the ice and liquid hydrocarbon are passed through the pressure energy exchange engines 126 and 128, the pressure upon the mixture is increased, and the streams are discharged at relatively high pressure from the engines in the discharge streams 130 and 132. These streams are merged and are conveyed in a stream 134 to a high pressure pump 136. The function of the high pressure pump 136 is to impart to the ice-hydrocarbon liquid stream 134 the residual pressure which is required to overcome the pressure losses in the high pressure system, and to supply the final pressure increment required for operating the energy exchange engines 126 and 128.

From the high pressure pump 136, the now highly pressurized mixture is directed via a suitable conduit or pipeline 138 into the coalescence separator 140. In the coalescence separator 140 constructed in accordance with the present invention, the fresh water resulting from the melting of the ice, and the hydrocarbon slurry resulting from the formation of solid particles of hydrocarbon due to the final pressurization in the high pressure pump 136, are separated by the concurrent influence of gravity (density difference) and the electrical field developed in the separator.

The fresh water from the separator 140, still under the final high pressure imparted to the mixture by the high pressure pump 136, is directed through a conduit or pipeline 142 to the high pressure side of the pressure energy exchange engine 128. Here the fresh water transfers to the discharge stream 132 its energy of pressurization. After transferring its energy of pressurization to the ice-hydrocarbon liquid, the fresh water is discharged at substantially atmospheric pressure from the engine 128 through the conduit or pipeline 144 to a suitable storage facility.

It may be noted that pressurization by the high pressure pump 136 effects the melting of the ice particles and the freezing of the hydrocarbon to produce solid hydrocarbon particles, and thus regenerate the hydrocarbon slurry, and in undergoing such transformation, the mixture passing through the high pressure pump 136 undergoes a significant reduction in volume. It is thus necessary to add some high pressure fresh water via the conduit 146 to make up for the volume reduction in the system.

The hydrocarbon slurry wsich is separated from the fresh water in the coalescence separator 140 is directed through a pipeline or conduit 148 to the high pressure side of the pressure energy exhcange engine 126. Here the hydrocarbon slurry transfers its energy of pressurization to the ice-hydrocarbon liquid which is charged to the low pressure side of the pressure energy exchange engine 126. The hydrocarbon slurry then leaves the engine 126 at substantially atmospheric pressure via the line or conduit 150. In general, this hydrocarbon slurry will be recycled to the first step of the exchange crystallization process in which it is mixed with incoming cold saline water, and the solid particles of hydrocarbon in the slurry are there melted to freeze the ice particles from the incoming saline solution.

The inclusion of the electrical coalescence separator 140 in the system for the purpose of effecting the separation of fresh water from the hydrocarbon slurry results in a more efficient recovery of fresh water from the slurry, and a reduction in the total energy requirement required to recover a unit amount of fresh water by the use of the exchange crystallization process.

Although certain preferred embodiments of the present invention have been herein described in order to illustrate the principles underlying the invention, it is to be understood that various changes and innovations can be effected in the described procedure without departure from the basic principles of the invention. Changes of this type are therefore deemed to be circumscribed by the spirit and scope of the invention except as the same may be necessarily limited by the appended claims or reasonable equivalents thereof.

What is claimed is:

1. In a process for removing fresh water from an aqueous solution, which process includes the steps of freezing ice crystals from the aqueous solution, then applying pressure to a mixture of said ice crystals and an organic liquid to form water and a slurry of organic liquid containing solid organic particles, the improvement which comprises:

subjecting the product mixture of slurry and water to a high potential electric field characterized in having a voltage gradient of at least 1,000 volts per inch; and separating the water from the organic slurry under the concurrent influence of gravity and the high potential field while the mixture remains under pressure.

2. The improvement defined in claim 1 wherein alternating current is used in establishing said high potential field.

3. The improvement defined in claim 1 wherein said product mixture is subjected to said high potential field by introducing the mixture immediately above an interface between the slurry and the water separated therefrom, and flowing the mixture upwardly through vertically spaced electrode grids.

4. The improvement defined in claim 1 wherein during the subjection of said product mixture of water and slurry to said electrostatic field, the product mixture is subjected to a pressure of from about 50 atmospheres to about 200 atmospheres, and to a temperature of from about 25° F. to about 40° F.

5. The improvement defined in claim 1 and further characterized to include the step of agitating the mixture of water and slurry during subjection to the high potential field to maintain the homogeneity of the mixture in the field.

6. The improvement defined in claim 1 wherein said slurry is cycled to the zone of freezing of said ice crystals from said aqueous solution and is subjected to direct contact heat exchange with said aqueous solution.

7. The improvement defined in claim 4 wherein said organic slurry is removed from a location above said electrode grids.

8. The improvement defined in claim 8 wherein alternating current is used in establishing said high potential field.

9. The improvement defined in claim 8 wherein during the subjection of said product mixture of water and slurry to said high potential field, the product mixture is subjected to a pressure of from about 50 atmospheres to about 200 atmospheres.

10. The improvement defined in claim 9 wherein during the subjection of said product mixture to said high potential field, the product mixture is subjected to a temperature of from about 25° F. to about 40° F.

11. A process for recovering relatively pure water from a saline aqueous solution comprising:
freezing ice crystals from the solution by placing the solution in heat exchange relation to a solid organic heat exchange medium which undergoes melting due to the heat exchange, and which has the following properties:
stable in the presence of, and unreactive with, water and the solute of the aqueous solution, to the extent that no irreversible, physical or chemical transformations occur upon contact with the solution;
a density less than that of the aqueous solution and less than that of fresh water;
a freezing point of from about 0° C. to about −10° C. at atmospheric pressure; and
a positive coefficient of melting temperature vs. pressure, $dT/dP$;
separating a substantial portion of the aqueous solution from the ice crystals and liquid orgnaic heat exchange medium;
increasing the pressure on the ice crystals and organic liquid exchange medium to convert a substantial portion of the ice crystals to fresh water, and a portion of the organic liquid exchange medium to solid particles; and
subjecting the mixture of fresh water, liquid exchange medium and solid particles of exchange medium to the water coalescing effect of a high potential electrical field having a voltage gradient in the mixture of at least 1,000 volts per inch to separate water from the solid and liquid organic heat exchange medium.

12. The process defined in claim 11 wherein said separation of a substantial portion of the aqueous solution from the ice crystals and liquid organic medium is effected by subjecting the mixture to a high potential electrical field.

13. The process defined in claim 11 and further characterized to include the step of recycling the organic heat exchange medium from the locus of the separation of fresh water therefrom to the freezing zone where ice crystals are frozen from the saline aqueous solution.

14. In a process for removing fresh water from an aqueous solution, which process includes the steps of freezing ice crystals from the aqueous solution, then applying pressure to a mixture of said ice crystals and an organic liquid to form water and a slurry of organic liquid containing solid organic particles, the improvement which comprises:
subjecting the product mixture of slurry and water to a high potential electric field by continuously introducing the product mixture at multiple points, and in different, substantially horizontally extending directions, all at locations above an interface between a fresh water layer and said organic liquid, said electric field extending at least between one electrode and the fresh water layer acting as a second electrode, said multiple points of introduction of the product mixture into said field being between said one electrode and said interface; and
separating the water from the organic slurry under the concurrent influence of gravity and the high potential electric field while the mixture remains under pressure, and at a temperature such that said particles remain solid and do not melt, and said water does not freeze.

References Cited
UNITED STATES PATENTS

| 3,399,538 | 9/1968 | Sliepcevich et al. | 62—58 |
| 3,437,575 | 4/1969 | Gross et al. | 204—186 |
| 3,196,095 | 7/1965 | Wadsworth | 204—186 |
| 1,095,893 | 5/1914 | Landreth | 204—186 |
| 2,691,280 | 10/1954 | Albert | 204—190 |

JOHN H. MACK, Primary Examiner

N. A. KAPLAN, Assistant Examiner

U.S. Cl. X.R.

62—58, 123; 204—302